United States Patent [19]

Goel et al.

[11] Patent Number: 4,626,475
[45] Date of Patent: Dec. 2, 1986

[54] POLYURETHANE PRESSURE SENSITIVE ADHESIVES FOR BONDING LAYERED STRUCTURES

[75] Inventors: Anil Goel, Worthington; Joseph Holehouse, Columbus; Kenneth Barnett, Worthington, all of Ohio

[73] Assignee: Ashland Oil, Inc., Ashland, Ky.

[21] Appl. No.: 777,111

[22] Filed: Sep. 18, 1985

[51] Int. Cl.$^4$ .................... B32B 27/00; C08L 23/00; C08G 18/28; C08G 18/77
[52] U.S. Cl. ................ 428/423.1; 428/423.7; 428/425.8; 524/270; 524/764; 528/54; 528/56; 528/58; 528/73
[58] Field of Search ............... 528/73, 54; 524/270, 524/764; 428/423.1, 423.7, 425.8

[56] References Cited

U.S. PATENT DOCUMENTS

| | | | |
|---|---|---|---|
| 4,549,005 | 10/1985 | Goel | 528/73 |
| 4,558,113 | 12/1985 | Goel | 528/73 |
| 4,562,240 | 12/1985 | Goel et al. | 528/73 |

*Primary Examiner*—Herbert S. Cockeram
*Attorney, Agent, or Firm*—John F. Jones

[57] ABSTRACT

A process for the production of a pressure sensitive adhesive comprising the interaction of a high molecular weight polyol, a polyisocyanate and a small amount of a bicyclic amide acetal wherein the process results in significant improvement in physical properties, e.g., a high degree of adhesive and cohesive strength, is described.

4 Claims, No Drawings

POLYURETHANE PRESSURE SENSITIVE ADHESIVES FOR BONDING LAYERED STRUCTURES

This invention relates to a process for improving the properties of pressure sensitive adhesive formulations based on the polyol-polyisocyanate reaction by the inclusion of small amounts of a bicyclic amide acetal in the adhesive formulation.

Pressure sensitive adhesive resins are widely employed in the form of a film-like coating on a variety of superstrates in order to bond the superstrate to a normally non-adhering substrate. In general, pressure sensitive resins must exhibit permanent tackiness and at the same time must possess a requisite high degree of bonding capability; i.e., adhesiveness as well as cohesiveness. The most common pressure sensitive resins used commercially now are based on acrylic polymers.

The cohesive strength of a pressure sensitive adhesive resin is a particularly critical property and the molecular weight of the polymer usually is the governing factor in this regard. Higher molecular weight favors better cohesiveness in the formulation. In practice, however, the molecular weight requirement poses viscosity problems and the use of an organic solution of the polymer for applying a coating of the adhesive to the superstrate is a general practice. An objective of this invention is to provide a pressure sensitive adhesive which is free from non-reactive solvent and possesses a high degree of adhesive and cohesive strength.

Polyurethane polymers with varying physical properties obtained from the reactions of polyisocyanates with diols and polyols have been extensively studied and have been widely used in applications such as coatings, structural adhesives, thermoset plastics, and the like. It is well known that the reactions of a diisocyanate with a long chain diol results in a soft elastomeric product which lacks good cohesive strength. The use of a short chain polyol and/or a small amount of crosslinker triol or tetraol to improve the cohesive strength of the elastomers has been customary in the prior art.

We have discovered that the inclusion of a small amount of a bicyclic amide acetal in the reactions of long chain polyols with di or polyisocyanates (NCO functionality ranging between 2.0 and 2.3 per molecule) results in significant improvement of the physical properties of the polyurethane polymer and that these polymers exhibit excellent pressure sensitive adhesive properties.

The bicyclic amide acetals useful in the practice of this invention include those of Formula I

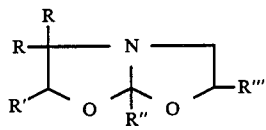

wherein R, R', R" and R"' independently represent hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms or an aryl ether group having from 6 to 20 carbon atoms.

The high molecular weight polyols useful in the practice of this invention include those having molecular weights of about 400 or greater with a hydroxy functionality of at least two. The most common polyols may also contain functionalities such as alkylene ether, ester, amide, and urethane groups. Representative examples of polyols are poly(alkylene ether) polyols obtained from the polymerization of ethylene oxide, propylene oxide, butylene oxide, tetrahydrofuran, styrene oxide, and caprolactone alone or with other materials. Polybutadienes having hydroxyl groups as well as other known hydroxyl containing vinyl addition polymers can be used.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two which are more fully disclosed in U.S. Pat. Nos. 3,350,362 and 3,382,215. Polyisocyanates which are polymeric in nature including isocyanate prepolymers of all types are included in this invention.

The polymers obtained from the polymerization of high molecular weight polyols, bicyclic amide acetals and polyisocyanates by the process of this invention are excellent elastomers having good adhesive and cohesive properties which can be enhanced by the presence of known tackifiers such as rosin and rosin derivatives (such as glycerine resin ester, hydrogenated pentaerythritol ester, polymerized rosin, rosin ester, etc.) aromatic hydrocarbon resins (such as coumarone-indene resins), aliphatic hydrocarbon resins (such as cis- and trans-piperylene based, isoprene based, etc.), terpene resins, terpene phenolics, acid modified resins and the like more fully described in "Handbook of Pressure Sensitive Adhesive Technology" edited by D. Satas.

In a typical polymer product obtained from the reaction of poly(propylene oxide) diol capped with ethylene oxide (molecular weight of 2,000) with liquid methylene bis(phenyl isocyanate) in the presence of a urethane catalyst and tackifier (Zonester-75, a thermoplastic pentaerythritol ester of disproportionated tall oil resin from Arizona Chemical Co.) shows poor 180 degree peel strength (PSTC-1 which is a test of the Pressure Sensitive Tape Council) (5 ounces/inch) and 0 hour shear resistance (PSTC-7). The use of small amounts of a bicyclic amide acetal (1–10% by weight based on the weight of the high molecular weight polyol) in accordance with this invention results in significant physical property improvement. For instance, the use of 4% by weight of bicyclic amide acetal of Formula I in which R,R' and R"' are hydrogen and R" is methyl provides significant improvement of the 180 degree peel strength (45 oz/inch) and shear resistance of greater than 23 hours. The bicyclic amide acetal is considered to be bifunctional towards isocyanate functionality in these systems. The equivalent ratio of the isocyanate functionality to the combined hydroxy and bicyclic amide acetal functionality may be in the range of from about 0.8 to 1.3 and preferably near 1 to 1.

The reaction between the high molecular weight polyol, polyisocyanate and bicyclic amide acetal to produce the pressure sensitive adhesives of this invention is advantageously carried out at a temperature in the range of from about room temperature up to about 200° C.

It is within the scope of the present invention to include urethane catalysts such as organotin compounds, tertiary amines and metal salts such as iron acetylacetonate and other well known materials useful for this purpose in our process. It is also within the scope of the present invention to include tackifiers known in the art to improve the properties of adhesives.

This invention is further illustrated in the following representative examples.

EXAMPLE 1

To a solution of 40 g of poly (propylene oxide) diol capped with ethylene oxide (Pluracol 2010 from BASF, having a molecular weight of about 2,000), 1.62 g of a bicyclic amide acetal of Formula I in which R, R' and R''' represent hydrogen and R'' represents a methyl group and 0.04 g of stannous octoate was mixed 9.52 g of (MDI) liquid methylene bis (phenyl isocyanate) (NCO equivalent weight of 144). A part of this mixture was applied as a film on a polyethylene terephthalate film of about 1 mil thickness for testing as a pressure sensitive adhesive and the remaining material was poured into a mold prepared by two silicone mold release coated parallel glass plates held apart by 0.1 inch thick spacers. The mold was left at room temperature to cure the contents for two days and the pressure sensitive adhesive test specimen was cured at room temperature for 1 hour followed by 5 minutes at 130° C. The elastomeric polymer sheet when taken from the mold was found to have a tensile strength (ASTM D 412) of about 440 psi, an elongation of about 300% and a Shore A hardness (ASTM D 2240) of 49. The adhesive film was tested and was found to have a shear resistance (PSTC-7) of greater than 23 hours, a 180 degree peel (PSTC-1) of 47 oz/inch and Polyken Probe Tack (ASTM D 2979) of 140.

EXAMPLE 2

A solution of 10.3 g of the polyol of Example 1 and 2 g of Zonester-75 (tackifier, a thermoplastic pentaerythritol ester of disproportionated tall oil rosin from Arizona Chemical Company) was mixed with 0.7 g of the bicyclic amide acetal described in Example 1, 0.01 g of stannous octoate and 3.1 g of MDI. The solution was used to draw down a one mil thickness film on a Mylar polyester sheet and was left to cure at room temperature for 1 hour followed by 10 minutes at 130° C. The adhesive sample was tested as a pressure sensitive adhesive and it was found to have a Polyken probe tack of 220, 180° peel of 78 oz/inch (against steel substrate) and 37 oz/inch (against polyethylene substrate) and 500 g shear resistance of greater than 23 hours.

EXAMPLE 3

The procedure of Example 2 was followed using 120 g of the polyol of Example 1, 200 g of Zonester-75, 0.4 g of the bicyclic amide acetal of Example 1, 0.01 g of stannous octoate and 2.28 g of MDI. The cured 1.1 mil thick adhesive film showed tack 660, 180° peel of 45 oz/inch (against steel substrate) and 500 g shear resistance of greater than 23 hours.

EXAMPLE 4

This example is for comparative purposes and is outside the scope of the present invention. The procedure of Example 2 was followed except that no bicyclic amide acetal was used. The 1 mil thick adhesive film on Mylar polyester film was found to have a tack 350, 180° peel strength of 5 oz/inch and a 500 g shear resistance of 0 hours.

EXAMPLE 5

The procedure of Example 2 was followed using the reaction mixture of Example 3 except that no tackifier was included. The 1 mil thick film was found to have a tack of 300, a 180° peel strength of 34 oz/inch and a 500 g shear resistance of greater than 96 hours.

EXAMPLE 6

The procedure of Example 2 was followed using 9 g of poly(tetramethylene oxide) diol (hydroxy equivalent weight of 320), 2 g of Zonester 100 as tackifier, 0.2 g of the bicyclic amide acetal of Example 1, 0.02 g of stannous octoate and 3.0 g of MDI. The 1 mil thick adhesive film showed 180° peel strength of 35 oz/inch and shear strength of greater than 22 hours.

EXAMPLE 7

A solution of 0.3 g of iron acetylacetonate in 2 ml of toluene was mixed with 100 g of the polyol of Example 1. The toluene was removed from the resulting mixture on a rotary evaporator under reduced pressure. The resulting orange-red colored solution was used for the preparation of an adhesive film in accordance with the procedure of Example 2. The reaction mixture was made up of 10 g of the polyol, 0.5 g of poly(propylene oxide) tetraol capped with ethylene oxide (hydroxyl number 450), 2.0 g of Zonester 75, 0.2 g of the bicyclic amide acetal of Example 1 and 2.6 g of MDI. The 1 mil thick adhesive film on Mylar sheet showed a tack 410, 180° peel strength of 37 oz/inch (steel) and 27 oz/inch (polyethylene) and a shear resistance (500 g) of greater than 20 hours. The 1000 g shear resistance was greater than 15 hours.

EXAMPLE 8

The procedure of Example 2 was followed using 5.0 g of the polyol of Example 1, 2.5 g of 4,000 molecular weight poly(propylene oxide) triol capped with ethylene oxide, 2.0 g of Zonester, 0.3 g of the bicyclic amide acetal of Example 1, 0.02 g of stannous octoate and 2.1 g of MDI. The 1 mil thick film on Mylar showed tack 240, 180° peel strength of 28 oz/inch and a 1,000 g shear resistance of greater than 5 hours.

We claim:

1. The structure composed of at least two surfaces of at least two materials bonded together by the intercalation of a pressure sensitive adhesive produced by the reaction of a polyisocyanate and a polyol having a molecular weight of 400 or greater in the presence of from 1 to 10% by weight of a bicyclic amide acetal based on the weight of polyol.

2. The structure of claim 1 wherein the bicyclic amide acetal is one having the formula

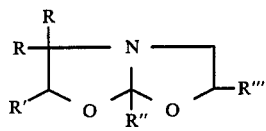

wherein R, R', R" and R'" independently represent hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms or an aryl ether group having from 6 to 20 carbon atoms.

3. The structure of claim 2 wherein the polyisocyanate has a NCO functionality of from 2 to 2.3 per molecule.

4. The structure of claim 3 wherein the equivalent ratio of the isocyanate functionality in the polyisocyanate to the combined hydroxy functionality in the polyol and bicyclic amide acetal functionality falls in the range of from about 0.8 to 1.3.

* * * * *